April 7, 1942.   W. O. BAER ET AL   2,278,632

GENERATOR CONTROL SYSTEM

Filed Dec. 14, 1939

Inventors
Walter O. Baer
Edwin W. Seeger
Frank H. Hubbard
By
Attorney

Patented Apr. 7, 1942

2,278,632

UNITED STATES PATENT OFFICE 2,278,632

GENERATOR CONTROL SYSTEM

Walter O. Baer, Milwaukee, and Edwin W. Seeger, Wauwatosa, Wis., assignors to Cutler-Hammer, Inc., Milwaukee, Wis., a corporation of Delaware Application December 14, 1939, Serial No. 309,210

7 Claims. (Cl. 171—119)

This invention relates to generator control systems and more particularly to the control of alternators which are automatically connected to a translating circuit after they have attained the correct voltage and frequency.

An object of the invention is to provide a controller which is adapted to effect connection of an alternator to a translating circuit only when the voltage and the frequency of the alternator are correct.

Another object is to provide a controller wherein the field regulator of the exciter of an alternator is ineffective to raise the voltage to the point of causing the main switch to close a translating circuit before normal frequency is attained.

Another object is to provide a controller having means to limit the voltage of an alternator while its frequency during starting or acceleration is substantially below normal frequency.

Another object is to provide automatic means for connecting an alternator to a translating circuit, which means is operable to prevent the generation of normal voltage so long as the frequency is substantially below normal.

The accompanying diagram is illustrative of two embodiments of the invention.

Figure 1:
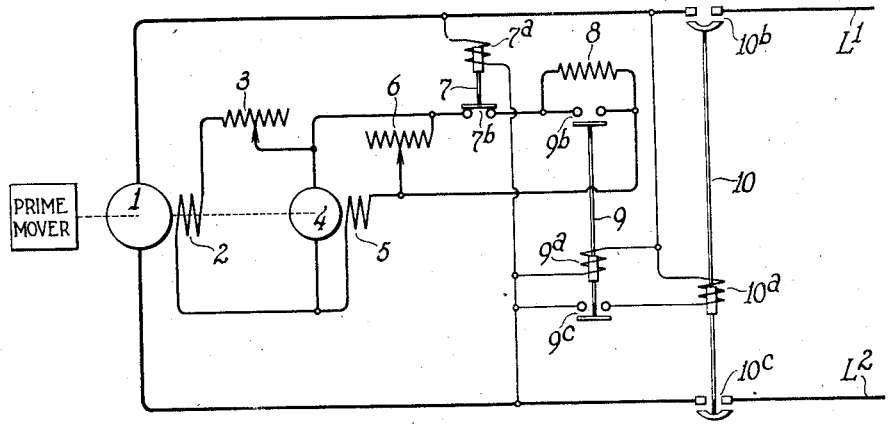
Figure 1 is a diagram of a system embodying the invention.

Referring to Fig. 1, the system illustrated thereby has an alternator having an armature 1 and an exciting fiield 2. Current for the field 2 is supplied through an adjustable resistor 3 by the armature 4 of an exciter which is self-excited by means of an exciting winding 5. The exciting winding 5 is connected in shunt with the armature 4 through an adjustable resistor 6. A voltage regulating relay 7 of the vibratory type has an energizing winding 7ª which is connected across the terminals of the alternator armature 1 and is provided with normally closed contacts 7ᵇ connected in series with a resistor 8 which is connected across the resistor 6. A voltage responsive relay 9 has an energizing winding 9ª, connected across the terminals of the armature 1, and normally open contacts 9ᵇ and 9ᶜ, respectively. The contacts 9ᵇ are connected in shunt with the resistor 8. A main switch 10 is provided with an energizing winding 10ª, which is adapted to be connected across the terminals of armature 1 upon closure of contacts 9ᶜ. The switch 10 is also provided with normally open main contacts 10ᵇ and 10ᶜ which upon closure connect the armature 1 across the translating lines L¹, L².

Figure 3:
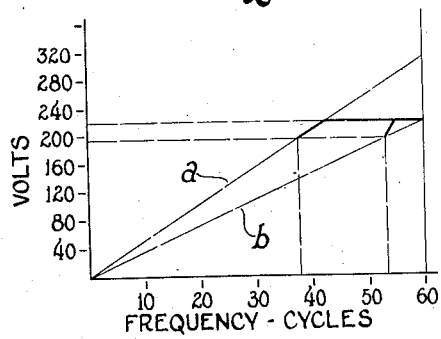
Fig. 3 is a diagram showing the relations between frequency and voltage of an alternator.

The operation of the system shown in Fig. 1 is as follows: Assuming at first that the resistor 8 were permanently shortcircuited, then when the generator is started by starting the prime mover the armature 1 revolves and as the speed increases an increasing voltage at increasing frequency is induced therein, the voltage depending upon the voltage supplied by the exciter generator 4, 5. As long as the voltage of the generator armature 1 is below normal, say 220 volts, the relay 7 permits its contacts 7ᵇ to remain closed, so that the exciter fiield 5 would be fully energized and the exciter armature 4 would supply to the field 2 of the alternator a voltage which would vary as shown by curve $a$ of Fig. 3 and which would be normal at a speed considerably below the normal frequency, so that a voltage responsive relay connected across the armature and adapted to close the translating circuit would respond. As shown in Fig. 3, such a voltage responsive relay would therefore respond at a generator frequency of 38 cycles which is objectionable. However, with the resistor 8 connected in circuit and controlled as shown, relay 9 which is adjusted to respond at about 195 volts is in the position shown; that is, contacts 9ᵇ are kept open and the resistor 8 is connected in series with the field 5 and in parallel with the rheostat 6, even though the contacts 7ᵇ are closed. The resistor 8 is so proportioned that the voltage which the alternator can attain at full speed does not exceed normal voltage. Thus the resistor 8 may be proportioned to produce a voltage of the alternator as per curve $b$ of Fig. 3, so as to attain 195 volts at 53 cycles. At this point the relay 9 responds to short circuit the resistor 8 and it simultaneously energizes switch 10 to connect the alternator to the translating circuit.

As the alternator voltage reaches 220 volts the relay 7 opens its contacts to insert resistor 6 in circuit with the exciter field and thereafter continues to vibrate to maintain the voltage substantially constant at 220 volts.

Figure 2:
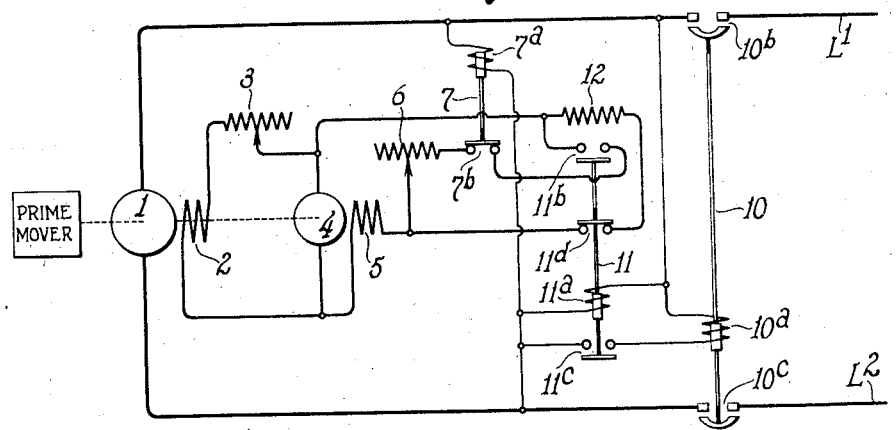
Fig. 2 is a modification of the system illustrated in Fig. 1.

The system illustrated in Fig. 2 is similar to that illustrated in Fig. 1, except that during the starting of the alternator the circuit of the exciter field 5 through the field regulating resistor 6 is interrupted, and a resistor 12 of relatively high resistance which reduces the field strength to an appropriate value is included in circuit with field 5, as a substitute for the resistor 6.

For that purpose the system is provided with an electromagnetic relay 11, having an energizing winding 11a which is connected across the terminals of the alternator armature 1, normally open contacts 11b and 11c and normally closed contacts 11d. The contacts 11c are in series with the energizing winding 10a of switch 10, while the contacts 11b are interposed between the voltage regulator contats 7b and one terminal of the exiter armature so as to open the circuit through the rheostat 6 when relay 11 is deenergized. At the same time the contacts 11d close a circuit through the exciter field winding 5 and the rheostat 12.

The system illustrated in Fig. 2 operates as follows: During starting, the circuit through the resistor 6 and contacts 7b is opened at the normally open contacts 11b of the voltage responsive relay 11. At the same time the field 5 is energized by current flowing through normally closed contacts 11d and resistor 12. The resistor 12 is proportioned to reduce the exciter voltage to a value which induces in the armature 1 of the alternator a voltage of 195 volts at about 53 cycles at which the relay 11 responds to open the circuit through resistor 12, by opening of contacts 11d, and to close the circuit through the field rheostat 6 by closure of contacts 11b. At the same time contacts 11c close to energize switch 10 which closes the translating circuit at 10b, 10c.

It will be obvious that the invention is equally applicable to systems where the vibratory regulator 7 is acting directly on the alternator field 2, and it is equally obvious that any other suitable and known field regulator may be substituted for the vibratory regulator and rheostat shown in the drawing.

What we claim as new and desire to secure by Letters Patent is:

1. In a system for automatically connecting an alternator to a translating circuit, in combination, an alternator having an armature and a field winding, an exciter generator having an armature and a shunt field winding, means to connect said exciter armature in circuit with said alternator field winding, a field rheostat in circuit with said shunt field winding, a voltage regulator responsive to the voltage of said alternator armature and tending to control said rheostat so as to induce normal voltage in said alternator armature, a resistor connectable in parallel with said rheostat by said regulator and electromagnetic means responsive to said armature voltage and adapted to short circuit said resistor and to simultaneously connect said alternator armature to a translating circuit when said armature voltage attains substantially normal value.

2. In a system for automatically connecting an alternator to a translating circuit, in combination, an alternator having an armature and a field winding, an exciter generator having an armature and a shunt field winding, means to connect said exciter armature in circuit with said alternator field winding, a field rheostat adapted to be connected in circuit with said shunt field winding, a voltage regulator responsive to the voltage of said alternator armature and tending to control said rheostat so as to induce normal voltage in said alternator armature, a resistor proportioned when inserted in circuit with said shunt field winding to limit the voltage induced in said alternator armature to normal voltage at substantially full speed of said alternator, and electromagnetic means responsive to said voltage and adapted to insert said resistor in circuit with said shunt field winding when said voltage is below normal and to disconnect said resistor and insert said rheostat in circuit with said shunt field winding and simultaneously connect said alternator armature to a translating circuit when said voltage is substantially normal.

3. In a system for automatically connecting an alternator to a translating circuit, in combination, an alternator having an armature and a field winding, an electromagnetic switch adapted when energized to connect said armature to a translating circuit, automatic means adapted to energize said field including means responsive to the armature voltage and tending to induce therein normal voltage, a resistor adapted to be inserted in circuit with said energizing means and proportioned to reduce the current in said field winding to a value which will induce substantially normal voltage in said alternator armature at substantially normal speed, and an electromagnetic relay responsive to the voltage of said alternator armature and adapted to insert said resistor in circuit with said energizing means to render said voltage responsive means inoperative when said voltage is below normal and to render said resistor inoperative and said voltage responsive means operative and simultaneously to energize said switch when said voltage attains substantially normal value.

4. In a system for automatically connecting an alternator to a translating circuit, in combination, an alternator having an armature and a field winding, an electromagnetic switch adapted when energized to connect said alternator armature to a translating circuit, a shunt exciter generator having an armature and a shunt field winding, means to connect said exciter armature in circuit with said alternator field winding, a field rheostat in circuit with said exciter field winding, a voltage regulator responsive to the voltage of said alternator armature and tending to control said rheostat so as to induce normal voltage in said alternator armature, a resistor adapted to be inserted in circuit with said exciter field winding and proportioned to reduce the voltage induced in said alternator armature to a value below normal voltage when the speed of said armature is below normal, and an electromagnetic relay responsive to said armature voltage and adapted to insert sid resistor in circuit with said exciter field winding to render said regulator inoperative when said armature voltage is below normal and to render said resistor inoperative and said regulator operative and simultaneously to energize said switch when said voltage attains substantially normal value.

5. In a system for automatically connecting an alternator to a translating circuit, in combination, an alternator having an armature and a field winding, an electromagnetic switch adapted when energized to connect said armature to a translating circuit, an exciter generator having an armature and a shunt field winding, means to connect said exciter armature in circuit with said alternator field winding, a field rheostat in circuit with said exciter field winding, a voltage regulator responsive to the voltage of said alternator armature and tending to control said rheostat so as to induce normal voltage in said alternator armature, a resistor connectable in parallel with said rheostat by said regulator, and an electromagnetic relay responsive to said voltage and adapted to short circuit said resistor and simultaneously energize said switch when said voltage attains substantially normal value.

6. In a system for automatically connecting an alternator to a translating circuit, in combination, an alternator having an armature and a field winding, an electromagnetic switch adapted, when energized, to connect said armature to a translating circuit, an exciter generator having an armature and a shunt field winding, means to connect said exciter armature in circuit with said alternator field winding, a field rheostat adapted to be connected in circuit with said exciter field winding, a voltage regulator responsive to the voltage of said alternator armature and tending to control said rheostat so as to induce normal voltage in said alternator armature, a resistor so proportioned that when inserted in circuit with said exciter field winding it will limit the voltage induced in said alternator armature to normal voltage at substantially full speed of said alternator, and an electromagnetic relay responsive to said voltage and adapted to insert said resistor in circuit with said exciter field winding when said armature voltage is below normal and to disconnect said resistor and insert said rheostat in circuit with said shunt field winding and simultaneously energize said switch when said voltage is substantially normal.

7. In a system for automatically connecting an alternator to a translating circuit, in combination, an alternator having an armature and a field winding, an exciter generator having an armature and a shunt field winding, means to connect said exciter armature in circuit with said alternator field winding, a field rheostat adapted to be connected in circuit with said shunt field winding, a voltage regulator responsive to the voltage of said alternator armature and tending to control said rheostat so as to induce normal voltage in said alternator armature, a resistor proportioned when inserted in circuit with said shunt field winding to limit the voltage induced in said alternator armature to normal voltage at substantially full speed of said alternator, and electromagnetic means responsive to said voltage and adapted to insert said resistor in circuit with said shunt field winding when said voltage is below normal and to render said resistor ineffective and said rheostat effective to control said shunt field winding and to simultaneously effect connection of said alternator armature to a translating circuit when said voltage is substantially normal.

WALTER O. BAER.
EDWIN W. SEEGER.